(12) United States Patent
Nakano et al.

(10) Patent No.: US 7,254,551 B2
(45) Date of Patent: Aug. 7, 2007

(54) MACHINE ELEMENT SELECTION SUPPORT SYSTEM

(75) Inventors: Hiroyuki Nakano, Kanagawa (JP); Yasushi Morita, Kanagawa (JP)

(73) Assignee: NSK Ltd., Tokyo (JP)

( * ) Notice: Subject to any disclaimer, the term of this patent is extended or adjusted under 35 U.S.C. 154(b) by 531 days.

(21) Appl. No.: 10/199,038

(22) Filed: Jul. 22, 2002

(65) Prior Publication Data

US 2003/0018542 A1 Jan. 23, 2003

(30) Foreign Application Priority Data

Jul. 23, 2001 (JP) .................. P. 2001-221621

(51) Int. Cl.
*G06Q 30/00* (2006.01)
(52) U.S. Cl. .......................... 705/26; 705/37
(58) Field of Classification Search .................. 705/28, 705/26
See application file for complete search history.

(56) References Cited

U.S. PATENT DOCUMENTS 5,666,493 A * 9/1997 Wojcik et al. ................ 705/26
6,167,383 A * 12/2000 Henson ........................ 705/26

FOREIGN PATENT DOCUMENTS

| DE | 003520683 A1 * | 12/1986 |
|---|---|---|
| JP | 10-149407 A | 2/1998 |
| JP | 11-312273 A | 11/1999 |
| JP | 2000-268092 A | 9/2000 |
| JP | 2000-357196 A | 12/2000 |
| JP | 2001-100832 A | 4/2001 |
| JP | 2001-147977 | 5/2001 |
| JP | 2001-175729 | 6/2001 |

OTHER PUBLICATIONS

World Leader Buys DEI [1 Edition], The Herald, Glasgow (UK), Jan. 12, 2000, downloaded from ProQuest on the Internet on Mar. 6, 2007, 1 page.*

* cited by examiner

*Primary Examiner*—James Zurita
(74) *Attorney, Agent, or Firm*—Sughrue Mion, PLLC

(57) ABSTRACT

The machine element selection support system comprises a database apparatus and a selection support server, while the selection support server is connected to a network. A customer, who wishes to select a machine element, gains access to the selection support server using a customer terminal. The selection support server receives, from the customer terminal, information relevant to the specifications and operating conditions of machine elements to be selected, the purchase conditions of the machine elements, and machine element selection information including information relevant to the output mode of information relevant to selection candidates, extracts selection candidates in accordance with not only the specifications and operating conditions information but also information stored in the specification databases and, in accordance with an output mode received, outputs to the customer terminal information relevant to the selection candidates that can satisfy purchase conditions of the extracted selection candidates.

17 Claims, 9 Drawing Sheets

FIG. 2

BEARING SPECIFICATION DATABASE

| PRODUCT NUMBER | INSIDE DIAMETER | OUTSIDE DIAMETER | WIDTH | PCD | ...... | INTERMEDIATE SEAT TYPE/ DIMENSION | PRE-LOAD SYSTEM | PERMISSIBLE ROTATING SPEED | STANDARD UNIT PRICE |
|---|---|---|---|---|---|---|---|---|---|
| NU213C3 *** | 65 | 120 | 23 | 92.5 | ...... | | | | |
| | | | | | | | | | |
| | | | | | | | | | |

FIG. 3

DELIVERY RESULT DATABASE

| PRODUCT NUMBER | CUSTOMER PART NUMBER | APPOINTED DATE OF DELIVERY | COMPANY NAME 1 | COMPANY NAME 2 |
|---|---|---|---|---|
| NU213C3 *** | ABC ***, *** | 1999/05/21 | *** CO., LTD. | *** FACTORY |
| | | | | |
| | | | | |

FIG. 4

STOCK DATABASE

| PRODUCT NUMBER | WAREHOUSE | FREE STOCK |
|---|---|---|
| NU213 *** | A3 | 200 |
|  | V1 | 50 |
| NU213C3 *** | C1 | 100 |
|  |  |  |
|  |  |  |

FIG. 5

FACTORY OPERATION DATABASE

| FACTORY IN CHARGE | LINE | APRIL | MAY | JUNE |
|---|---|---|---|---|
| [ F ] | L1 | NU213 *** | | NU1009 *** |
|  | L2 | 6301 | 6302 |  |
|  | L3 |  |  |  |
|  | ⋮ | ⋮ | ⋮ | ⋮ |

FIG. 6

CUSTOMER INFORMATION DATABASE

| USER ID | PASSWORD | NAME | DEPARTMENT IN CHARGE | PERSON IN CHARGE |
|---|---|---|---|---|
| S99999 | ****** | TARO NISSEI | DESIGN DEPT. | EAST 1 BRANCH, JIRO NISSEI |
|  |  |  |  |  |
|  |  |  |  |  |

FIG. 9

| DESIRED PURCHASE PRICE | PER SET | OUTPUT MODE | ☐ APPOINTED TIME OF DELIVERY |
| --- | --- | --- | --- |
| DESIRED PURCHASE QUANTITY | SET | | ☐ SMALL SPECIFICATIONS CHANGE |
| | | | ☐ LOW COST |

| DESIRED LIFE | | | TIME FOR USE (HRS/DAY) | |
| --- | --- | --- | --- | --- |
| ROTATING SPEED (MIN$^{-1}$) | COMMON USE: | | MAX | |
| DRIVE METHOD | | | COOLING METHOD | |
| MATERIAL | SHAFT: | | HOUSING: | |
| LUBRICATION | METHOD: | | LUBRICANT: | |
| PRE-LOAD METHOD | | | BEARING COMBINATION | |
| BEARING INSIDE DIAMETER | | | BEARING OUTSIDE DIAMETER | |
| BEARING WIDTH | | | BEARING POSITION | |
| FIT | SHAFT: | | HOUSING: | |
| SHAFT HOLLOW DIAMETER | | | HOUSING OUTSIDE DIAMETER | |
| PRESENCE OR ABSENCE OF INTERMEDIATE SEAT | | | INTERMEDIATE SEAT WIDTH | |
| MANUFACTURE OF INTERMEDIATE SEAT | | | TARGET PRE-LOAD WHEN ASSEMBLING | |

FIG. 10

| | PRODUCT NUMBER | UNIT PRICE | APPOINTED TIME OF DELIVERY | DELIVERY RESULTS | REMARKS |
|---|---|---|---|---|---|
| SPECIFICATION | NU1009*A | 1500 | 2 WEEKS | IN STOCK | OIL HOLE POSITION ARE DIFFERENT |
| SPECIFICATION | NU1009*B | 1330 STANDARD UNIT PRICE (1600) | 4 WEEKS | PRODUCIBLE IMMEDIATELY | UNDER DELIVERY 1000 SETS/MONTH |
| SPECIFICATION | NU1009*C | 1220 (1570) | 4 WEEKS +α | PRODUCIBLE IMMEDIATELY | UNDER DELIVERY 1000 SETS/MONTH | INTERMEDIATE SEAT REQUIRES POST-WORKING FOR DIMENSION |
| SPECIFICATION | NU1009*D | 1620 | 6 WEEKS | | |

MACHINE ELEMENT SELECTION SUPPORT SYSTEM

BACKGROUND OF THE INVENTION

The present invention relates to a machine element selection support system for supporting the selection of a machine element such as a rolling bearing (which is hereinafter referred to as a bearing simply).

For the optimum design of a machine apparatus, it is important to select a machine element which is used in the machine apparatus. Conventionally, to select a machine element such as a bearing, for example, there is taken such a procedure as shown in FIG. 12. That is, a customer creates information necessary for selection of a bearing (selection information) (Step 301), the customer conveys the selection information in writing to a person in charge of sales of a bearing in a bearing manufacturer (Step 302), the person in charge confirms the contents of the selection information (Step 303), the person in charge inquires the incomplete items of the contents of the selection information from the customer if necessary and adds the inquired and corrected items to the contents of the selection information (Step 304), and the person in charge transmits the selection information to a person in charge of design (Step 305). The person in charge of design selects the optimum bearing based on the selection information (Step 306). The selection results by the person in charge of design are transmitted to the person in charge of sales (Step 307), and the selection results are then transmitted to the customer (Step 308). The customer checks whether the selection results presented satisfy the business conditions (the cost and the appointed time of delivery) or not (Step 309). In case where the selection results satisfy the business conditions, the customer places an order based on the selection results presented (Step 310). In case where the selection results does not satisfy the business conditions, the selection information is reexamined and a similar procedure to the above is repeated.

Generally, in the case of a machine element such as a bearing, there does not always exist a ready-made machine element which can satisfy the need of a customer and thus, as the need arises, a new machine element must be designed. Also, even in case where there exists a ready-made machine element which can satisfy the need of the customer, the machine element may be out of stock, or, on account of the production line of a manufacturing factory, the appointed time of delivery may be delayed. In this case, the customer has to change the specifications of the machine element. In a conventional system, the delivery of the bearing selection information between as well as the presentation of the bearing selection results between the customer, the person in charge of sales and the person in charge of design depend on the human-to-human communication; and thus, the selection of the bearing according to the need of the customer cannot be made immediately.

SUMMARY OF THE INVENTION

The present invention aims at eliminating the drawbacks found in the above-mentioned conventional machine element selection system. Accordingly, it is an object of the present invention to provide a machine element selection support system which not only allows easy input and correction of information necessary for selection of a machine element such as a bearing at the customer's side but also is able to provide the optimum selection results of the machine element according to the wish of the customer in a short time.

In attaining the above object, according to the present invention, there is provided a machine element selection support system for supporting a selection of machine elements through a network, comprising: a selection support server connected to the network; and, a database apparatus accessible by the selection support server, wherein the database apparatus includes a specification database for preserving dimensions and specifications of the machine elements, wherein the selection support server receives machine element selection information from a terminal connected to the network, the machine element selection information including information relevant to specifications and operating conditions of the machine elements to be selected, purchase conditions of the machine elements, and information relevant to an output mode of information relevant to selection candidates, wherein the selection support server extracts the selection candidates in accordance with the information of the specifications and operating conditions and information stored in the specification database, and, in accordance with the output mode, and wherein the selection support server outputs to the terminal information relevant to the selection candidates, out of the extracted selection candidates, which satisfy the purchase conditions.

In a machine element selection support system according to the present invention, as the above-mentioned purchase conditions, there are used a purchase price and purchase quantity.

Also, in a machine element selection support system according to the present invention, the above-mentioned output mode specifies conditions for sorting the selection candidates output to the terminal. And, as the sorting conditions, the sorting conditions include prices of the selection candidates, appointed times of delivery and differences in specifications of the received machine element selection information. According to this structure, since the selection candidates are displayed according to the priority conditions of the customer, the customer can select the machine elements easily.

And, in a machine element selection support system according to the present invention, the database apparatus comprises a delivery results database for preserving information relevant to delivery results including delivery destination information by machine element, the specification database includes information relevant to the standard unit prices of the machine elements, and the selection support server uses, as the prices of the selection candidates, values obtained by correcting the standard unit prices based on the delivery results.

Also, in a machine element selection support system according to the present invention, the database apparatus comprises a stock database for preserving information relevant to the stock of the machine elements and an operation database for preserving the operation schedules of manufacturing factories for manufacturing machine elements, and the selection support server uses, as the appointed times of delivery of the selection candidates, values obtained based on the stock information and the operation schedules.

Further, in a machine element selection support system according to the present invention, the selection support server, on receiving a selection signal relating to the presented selection candidates from the terminal, instructs the start of the order reception processing on the machine elements selected by the selection signal.

In addition, in a machine element selection support system according to the present invention, a bearing is used as a machine element to be selection supported.

BRIEF DESCRIPTION OF THE DRAWINGS

FIG. 2 is a typical view of part of an example of a bearing specification database;

FIG. 3 is a typical view of part of an example of a delivery results database;

FIG. 4 is a typical view of part of an example of a stock database;

FIG. 5 is a typical view of part of an example of a factory operation database;

FIG. 6 is a typical view of part of an example of a customer database;

FIG. 9 is a view of an example of an input screen when the machine element selection information is input;

FIG. 10 is a view of an example of the selection result output;

DETAILED DESCRIPTION OF THE PREFERRED EMBODIMENTS

Figure 1:
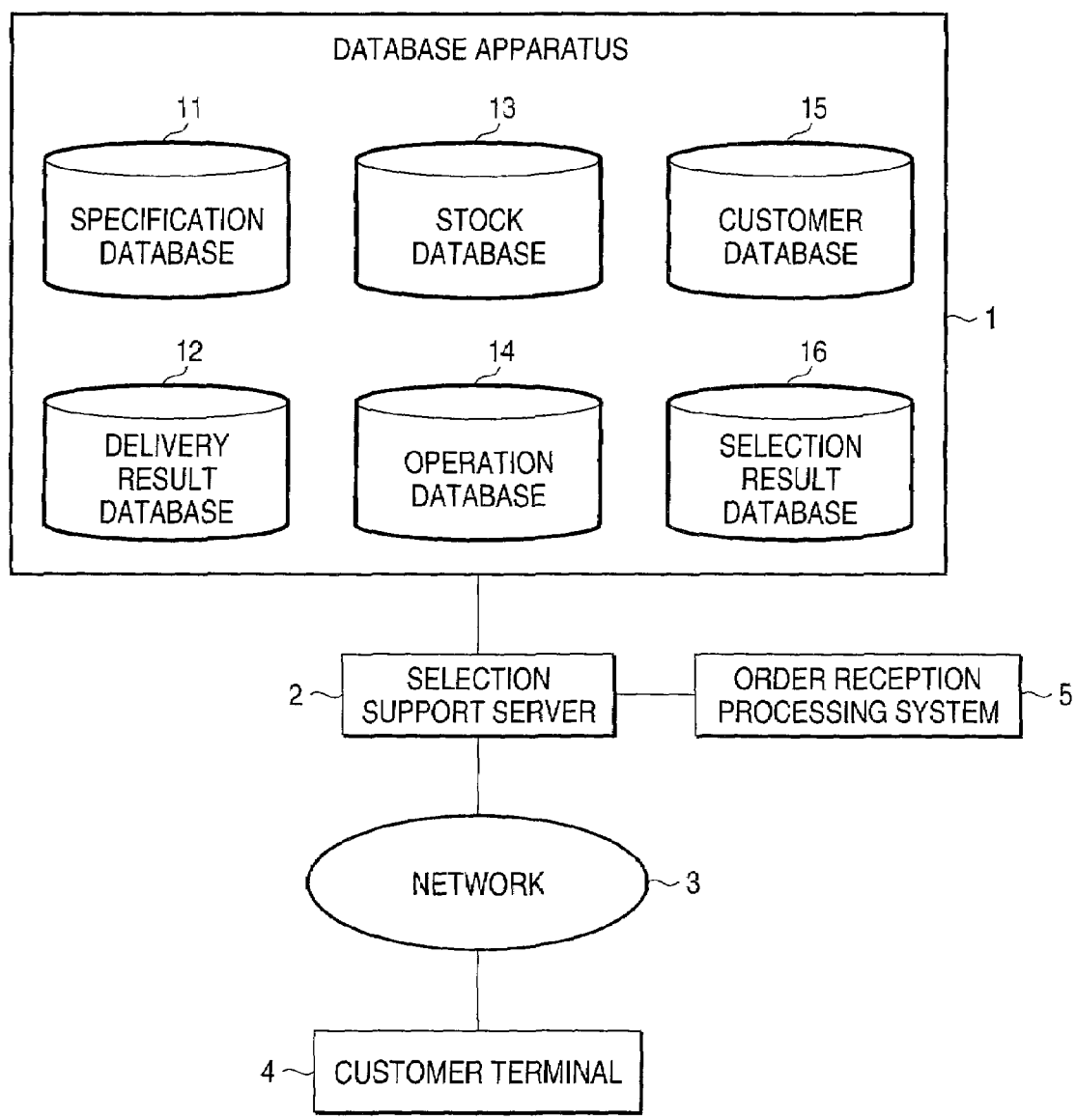
FIG. 1 is a view of a schematic structure of a machine element selection support system according to the present invention.

Now, description will be given below of a preferred embodiment of a machine element selection support system according to the present invention with reference to the accompanying drawings. FIG. 1 is a view of a schematic structure of a machine element selection support system according to the present embodiment of the present invention. The machine element selection support system shown in FIG. 1 comprises a database apparatus 1 and a selection support server 2, while the selection support server 2 is connected to a network 3. A customer, who wishes to select a machine element, gains access to the selection support server 2 using a customer terminal 4 which can be connected to the network 3. Also, the selection support server 2 is connected to an order reception processing system 5; and, when the customer, who has received the selection support of a machine element, places an order for the selected machine element, the selection support server 2 instructs the start of the processing of the received order based on the order placed by the customer. Therefore, the customer can institute the order placing procedure for a machine element simply. By the way, in the following, when a concrete example of a machine element is described, the machine element to be selection supported is considered as a bearing.

The database apparatus 1, which stores and manages various data to be used when a machine element selection is requested from the customer terminal 4, comprises a specification database 11, a delivery result database 12, a stock database 13, an operation database 14, a customer database 15, and a selection result database 16. These databases need not be always divided in this manner but they may be integrated. Also, the database apparatus 1 may not be always provided as a single database apparatus but may be dispersedly arranged. Further, part or all of the databases of the database apparatus 1 may be kept in a memory (not shown) which is disposed within the selection support server 2.

The specification database 11 stores therein data on the specifications of a machine element such as the type, dimension, and other specifications thereof in connection with the product number of the machine element. The other specification data are various data which are not set forth in a catalog of a machine element; for example, in the case of a cylindrical roller bearing, the other specification data include data on a pitch circle diameter, a roller diameter, the number of rollers, and the effective contact length. Now, FIG. 2 shows typically part of an example of the specification data base 11. In correspondence to the product number of the machine element, there are stored the dimension information such as an inside diameter and an outside diameter, the using method such as a preloading method, the performance index information such as the permissible rotating speeds, and the price information relevant to the standard price before it is reduced.

The delivery result database 12 holds delivery result information including the delivery destination information according to machine elements and, in the delivery result database 12, as shown in FIG. 3, there are stored appointed times of delivery and delivery destination company names in correspondence to the product numbers of machine elements. The stock database 13 stores therein the numbers of machine elements and the stock of the machine elements according to warehouses. FIG. 4 typically shows part of an example of the stock database 13. The operation database 14 holds the operation schedules of a machine element manufacturing factory and, from the operation database 14, there can be grasped the production conditions of the manufacturing factory. FIG. 5 typically shows part of an example of the operation database 14. The product numbers of the machine elements to be manufactured are bonded according to the manufacturing factories and according to the manufacturing lines. of an example of the delivery result database 12. The operation database 14 holds the operation schedules of a machine element manufacturing factory and, from the operation database 14, there can be grasped the production conditions of the manufacturing factory. FIG. 5 typically shows part of an example of the operation database 14. The product numbers of the machine elements to be manufactured are bonded according to the manufacturing factories and according to the manufacturing lines.

The customer database 15 stores therein various pieces of information according to customers. Such various pieces of information include a password as well which is necessary when using the selection support system. FIG. 6 typically shows part of an example of the customer database 15. The contents of the customer database 15 can also be used to process the reception of orders for machine elements. The selection result database 16 holds the bearing selection information and the selection results and the persons concerned can refer to the selection result database 16 in the next selection request and in its following selection requests.

The selection support server 2 receives information relevant to the specifications and operating conditions of a machine element to be selected, the purchase conditions of the machine element, and machine element selection information including information relevant to the output mode of information relating to selection candidates, extracts the selection candidates in accordance with the information relevant to the specifications and operating conditions of the machine elements and the information of the specification database 11, and outputs the information relevant to the selection candidate meeting the received purchase conditions of the extracted selection candidates to the customer terminal 4 in accordance with the received output mode. Such processings are executed using a given program and necessary data stored in a memory (not shown) disposed within the selection support server 2.

In the selection candidate extraction, the specifications and operating conditions of machine elements received from the customer terminal 4 are compared with the information of the specification database 11, and the machine elements satisfying such conditions are extracted. In this operation, if necessary, such comparison is made by calculating the performance indexes of the extracted machine elements based on the specifications and operating conditions of the machine elements. A calculation expression to find the performance indexes of machine elements such as the lives of the machine elements is known and thus the description thereof is omitted here. Also, as the extraction conditions, the specifications and operating conditions of machine elements received from the customer terminal 4 may not be used strictly but, preferably, they may be used with a certain margin. Especially, in case where the candidates of the machine elements extracted are few, such margin should be allowed.

The thus extracted machine elements are screened out in accordance with the purchase conditions received from the customer terminal 4. As the purchase conditions, there are used the purchase price and purchase quantities of the machine elements. That is, in case where the prices of the machine elements are apart from the desired prices, or in case where the desired quantities of the machine elements cannot be secured because the machine elements are out of stock and also there is no plan to produce the machine elements, the machine elements are extruded from the selection candidates.

Next, the appointed times of delivery of the respective machine elements are calculated, and the selection candidates are sorted in accordance with the output modes received from the customer terminal 4 and are output to the customer terminal 4. As the output mode to be used in such sorting, there can be selected the prices of the selection candidates, the appointed times of delivery of the selection candidates, and the difference in the specifications of the selected candidates from the desired machine element selection information.

The customer terminal 4 can be used when a customer selects machine elements and, as the customer terminal 4, there can be used a general-purpose personal computer which can be connected to the network 3. The order reception processing system 5 is used to process orders received for machine elements. Various order reception methods are now in use and thus a proper one of them can be employed according to cases.

Figure 7:
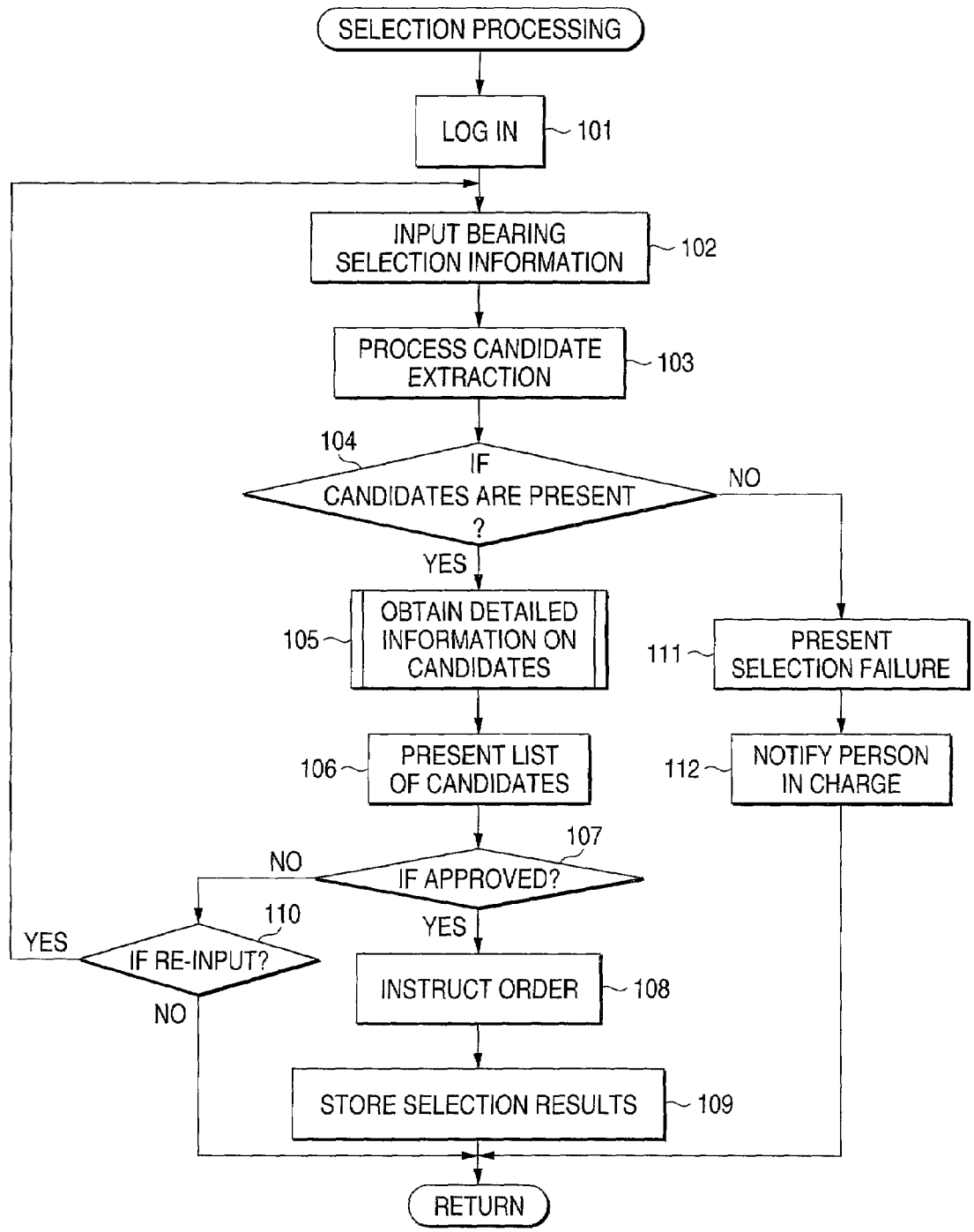
FIG. 7 is a schematic flow chart of operations to be executed for selection of a machine element.
Figure 8:
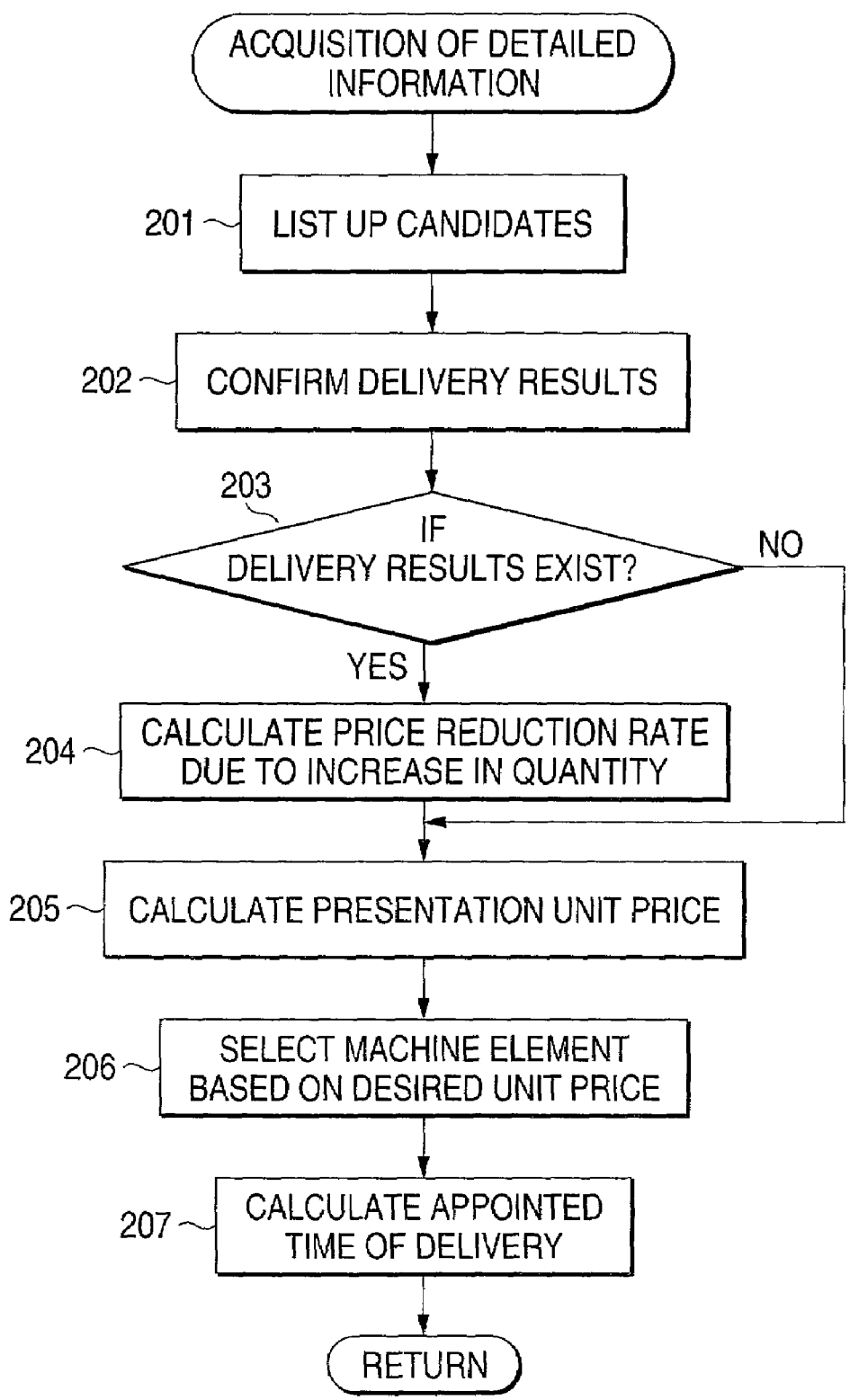
FIG. 8 is a detailed operation flow of Step 105 in FIG. 7.

Now, description will be given below of an operation to select machine elements using the system shown in FIG. 1 with reference to FIGS. 7 and 8. Here, FIG. 8 is a flow chart of the whole selection operation and FIG. 8 is a flow chart of the details of the operation to be executed in Step 105 shown in FIG. 7.

A customer connects the customer terminal 4 to the selection support server 2 through the network 3 and logs in the selection support server 2 (Step 101). In the log-in operation, the selection support server 2 urges the customer to input the previously registered ID information, E-mail address and password so as to authenticate the customer.

On completion of the user authentication, the selection support server 2 transmits such input screen information as shown in FIG. 9 to the customer terminal 4 to urge it to input the machine element selection information (Step 102), FIG. 9 shows an example of display when a bearing is selected as a machine element to be selected. However, the selection of the machine element is made before this screen is displayed. Also, FIG. 9 exhaustively shows only the machine element selection information that can be input and thus all items must not be always displayed on one screen.

An area 9*a* shown in FIG. 9 is an area into which the specifications and operating conditions of machine elements are input; for example, the dimensions, operating conditions and desired performances of machine elements can be input. By the way, all items must not be always input into this area 9*a*. An area 9*b* is an area into which the purchase conditions of machine elements are input; specifically, the unit price per set of a machine element desired for selection and the desired number of purchase sets may be input. An area 9*c* is an area into which a customer can input an output mode when there exist a plurality of machine element candidates meeting the desired conditions or meeting the conditions approximate to the desired conditions. Specifically, this is an area which is used to specify parameters to decide the sorting order for presentation of the plurality of machine element candidates. The appointed time of delivery in the area 9*c* is selected when the plurality of machine element candidates are to be output while they are sorted in an increasing order of the delivery time. Also, the small specifications change in the area 9*c* is selected when the change portion from the specifications input into the area 9*a* is small, and the low cost in the area 9*c* is selected when sorting in an increasing order of the price is desired. By the way, in the case of the area 9*c*, selection of the items thereof can also be previously selected using default values.

On receiving the machine element selection information input in the customer terminal 4, the selection support server 2 checks the specifications and operating conditions contained in the present machine element selection information against the information of the specification database 11, and extracts the selection candidates (Step 103). In this case, the selection support server 2 may also be structured so as to extract not only the selection candidates that can satisfy the received conditions completely but also the selection candidates that cannot meet part of the conditions.

In case where the selection candidates are extracted in the processing of Step 103, the processing goes to Step 105, whereas in case where the selection candidates are not extracted, the processing goes to Step 110. No extraction of the selection candidates means that the machine element satisfying the customer's desired conditions is not a ready-made machine element and, therefore, in Step 111, to the customer terminal 4, there is made a presentation to the effect that the candidate selection is impossible and a new machine element must be developed. The customer terminal 4 notifies the person in charge of the customer about the presentation, thereby ending the candidate selection processing (Step 112) The person in charge of the customer refers to the customer database 15 to thereby find out the customer.

In Step 105, there is obtained the detailed information relevant to the candidates that were extracted in Step 103. Firstly, in Step 201, the machine element candidates extracted are listed, and the delivery results of the listed machine elements to the present customer are confirmed using the delivery result database 12 and customer database 15 (Step 202). To confirm the delivery results, the product numbers of customers may be checked against the product numbers of the delivery result database to thereby extract the delivery customer names, the customer names may be extracted from the customer database 15 based on the customer ID information, and the delivery customer names maybe checked against the customer names extracted from the customer database 15.

It is checked whether the delivery results are present or not (Step 203). If present, the price reduction rate due to an increase in the quantity is calculated using a standard unit price contained in the specification database 11 (Step 204). And, in Step 205, the unit price that can be presented to the customer is calculated. In case where the price is not reduced, the standard unit price is used as the unit price that can be presented to the customer.

In case where the presentable unit price is obtained, in Step 206, the presentable unit price is compared with the customer's desired unit price and the machine elements equal to or higher than the customer's desired unit price are excluded from the candidate list (step 206). In Step 207, the appointed times of delivery of the machine elements that have not been excluded from the candidate list are calculated with reference to the stock database 13 and operation database 14 (Step 207). By the way, these processings are executed on all of the machine elements that have been extracted in Step 103.

In case where there is obtained the detailed information relevant to the extracted candidates in Step 105, in Step 106, the list of the candidates is presented to the customer terminal 4. In this case, there is presented the list that is sorted according to the output mode specified in the area 9c shown in FIG. 9. FIG. 10 shows an example of the selection results that are sorted according to the appointed times of delivery. In FIG. 10, in the case of a machine element having a product number NU1009B and a machine element having a product number NU1009C, due to presence of the delivery results to the customer, the unit prices of them are reduced with respect to the standard unit prices thereof. Also, in the "notes" of FIG. 10, there are presented the portions that are different from the customer's desired specifications. The detailed information relevant to machine elements presented can be displayed by pressing down a "specification" button shown in FIG. 10; with the label for example, it can be displayed in such a manner as shown in FIG. 11.

Figure 11:
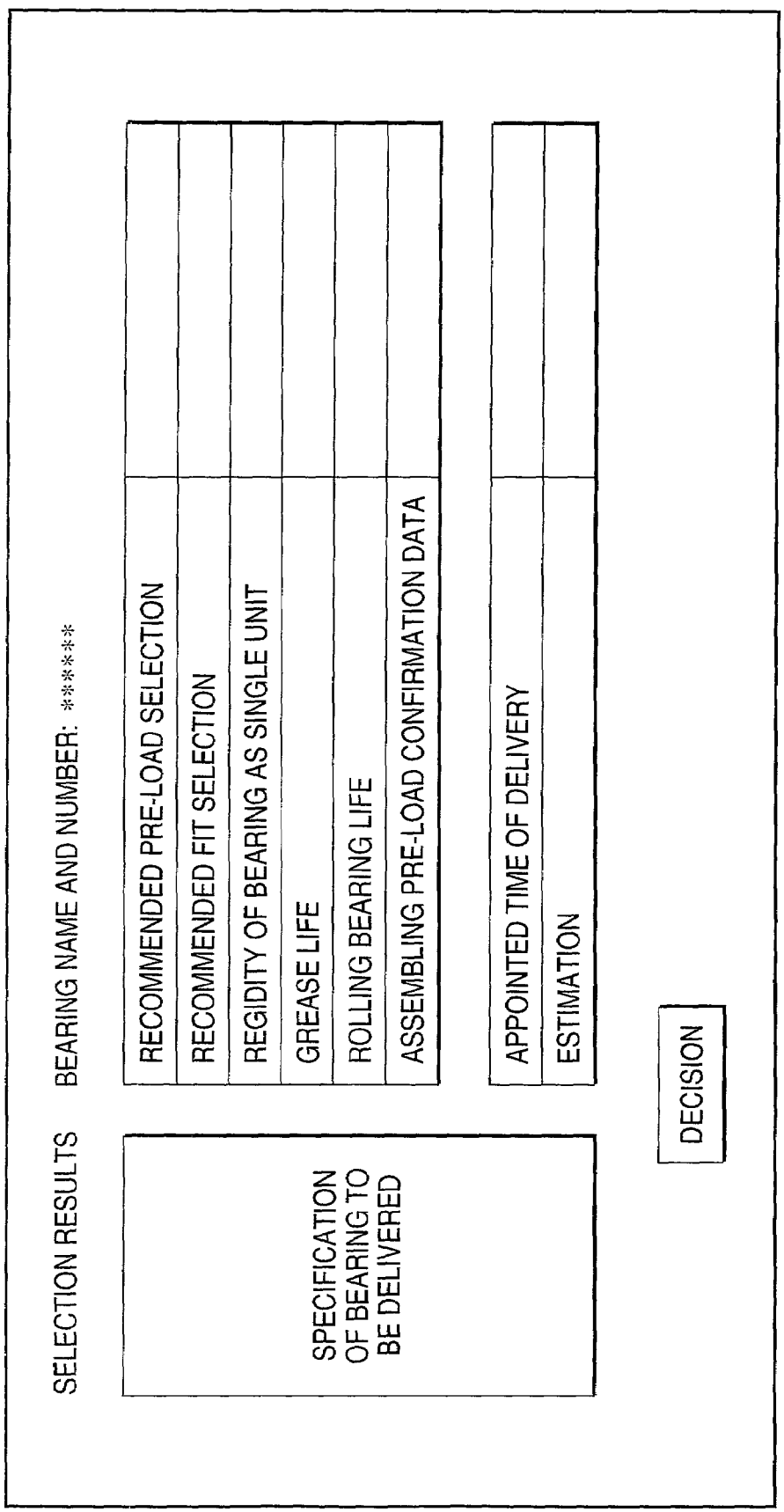
FIG. 11 is a view of an example of the detailed output of the selected machine element; and, FIG. 12 is a flow chart of a conventional machine element selection procedure.
Figure 12:
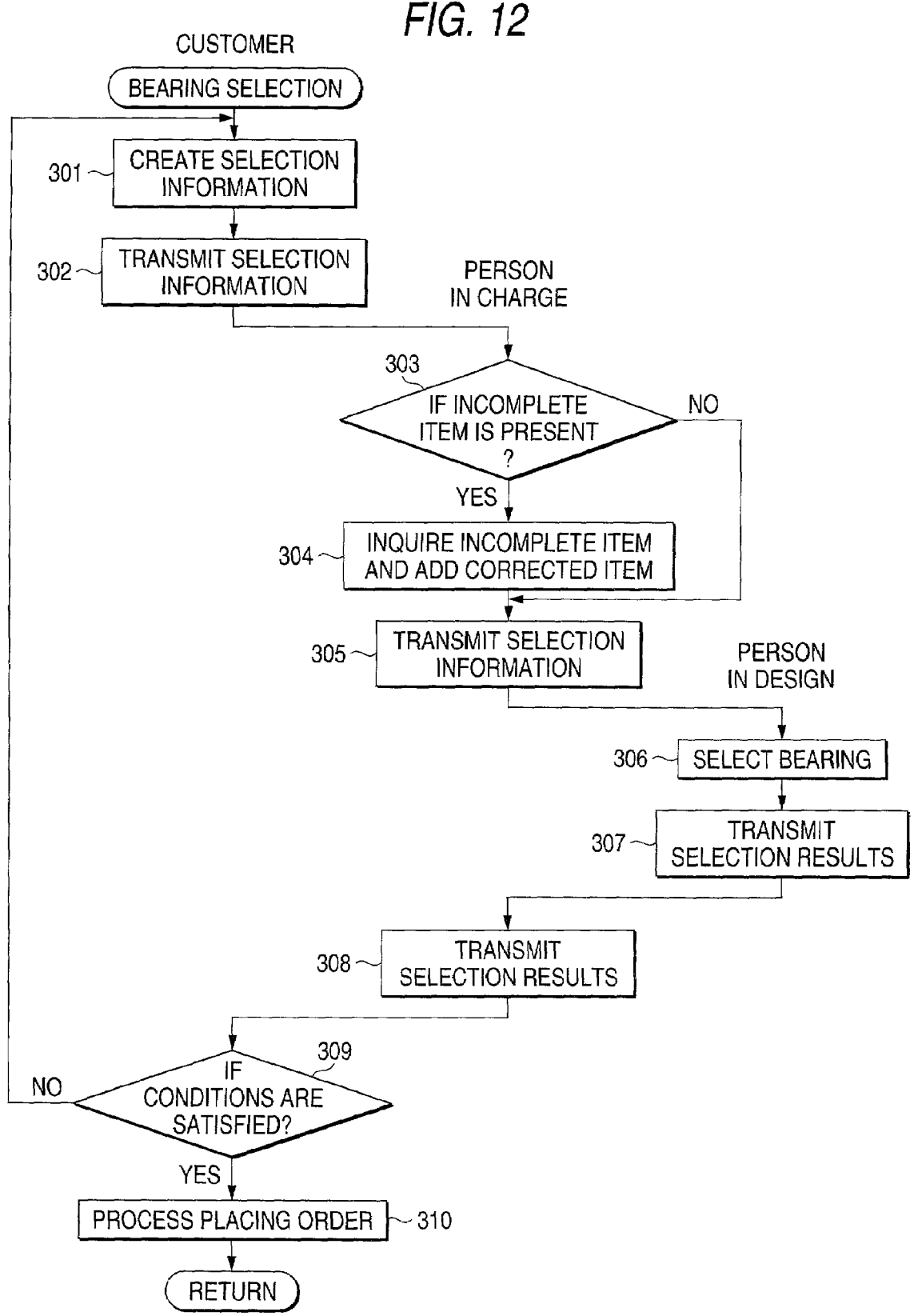

In case where, as a result of confirmation through the list shown in FIG. 10 and the detailed information shown in FIG. 11, the candidates are the desired machine elements or the machine elements the specifications of which can be changed in the allowable range, a "decision" button shown in FIG. 11 is depressed (Step 107). Thus, in Step 108, the order reception processing system 5 is instructed to start its order reception processing. Also, the machine element selection information and selection results are stored into the selection result database 16 (Step 109). In case where the selection results do not meet the wish of the customer, it is checked whether re-input is desired or not (Step 110). If the reinput is desired, the processing goes back to Step 102 and waits for the correction of the selection information and, after then, similar processings are to be executed.

As can be seen clearly from the foregoing description, according to the present invention, the information necessary for selection of machine elements can be easily input and corrected at the customer's end and the selection results of the optimum machine elements meeting the customer's wish can be obtained in a short time. Also, since a plurality of machine elements meeting the operating conditions can be presented, the optimum machine elements meeting the customer's wish can be selected in a short time. Further, an automatic order placing system is also possible.

What is claimed is:

1. A machine element selection support system for supporting a selection of machine elements through a network, comprising:
   a selection support server connected to the network; and,
   a database apparatus accessible by the selection support server,
   wherein the database apparatus includes a specification database for preserving dimensions and specifications of the machine elements, and the machine elements are bearings,
   wherein the selection support server receives machine element selection information from a terminal connected to the network, the machine element selection information including information relevant to specifications and operating conditions of the machine elements to be selected, purchase conditions of the machine elements, and information relevant to an output mode of information relevant to selection candidates,
   wherein the selection support server adds a margin to the specifications and operating conditions of the machine element selection information, compares the specifications and operating conditions with the added margin to information stored in the specification database, extracts the selection candidates based on the comparison, and when the selection support server extracts the selection candidates, the selection support server calculates performance indexes of the extracted selection candidates based on the specifications and operating conditions of the selection candidates, and
   wherein the selection support server outputs to the terminal information relevant to the selection candidates, out of the extracted selection candidates, which satisfy the purchase conditions.

2. Machine element selection support system as set forth in claim 1, wherein the purchase conditions includes a purchase price and purchase quantity.

3. The machine element selection support system as set forth in claim 2, wherein the output mode specifies conditions for sorting the selection candidates output to the terminal.

4. The machine element selection support system as set forth in claim 3, wherein the sorting conditions include the price of the selection candidates, appointed times of delivery and differences in specifications of the received machine element selection information.

5. The machine element selection support system as set forth in claim 4, wherein the database apparatus comprises a delivery results database for preserving information relevant to delivery results including delivery destination information by machine element, the specification database includes information relevant to the standard unit prices of the machine elements, and the selection support server uses, as the prices of the selection candidates, values obtained by correcting the standard unit prices based on the delivery results.

6. The machine element selection support system as set forth in claim 5, wherein the database apparatus comprises a stock database for preserving information relevant to the stock of the machine elements and an operation database for preserving the operation schedules of manufacturing factories for manufacturing machine elements, and the selection support server uses, as the appointed times of delivery of the selection candidates, values obtained based on the stock information and the operation schedules.

7. The machine element selection support system as set forth in claim 4, wherein the database apparatus comprises a stock database for preserving information relevant to the stock of the machine elements and an operation database for preserving the operation schedules of manufacturing factories for manufacturing machine elements, and the selection support server uses, as the appointed times of delivery of the selection candidates, values obtained based on the stock information and the operation schedules.

8. The machine element selection support system as set forth in claim 1, wherein the output mode specifies conditions for sorting the selection candidates output to the terminal.

9. The machine element selection support system as set forth in claim 8, wherein the sorting conditions include prices of the selection candidates, appointed times of delivery and differences in specifications of the received machine element selection information.

10. The machine element selection support system as set forth in claim 9, wherein the database apparatus comprises a delivery results database for preserving information relevant to delivery results including delivery destination information by the machine element, the specification database includes information relevant to the standard unit prices of the machine elements, and the selection support server uses, as the prices of the selection candidates, values obtained by correcting the standard unit prices based on the delivery results.

11. The machine element selection support system as set forth in claim 10, wherein the database apparatus comprises a stock database for preserving information relevant to the stock of the machine elements and an operation database for preserving the operation schedules of manufacturing factories for manufacturing machine elements, and the selection support server uses, as the appointed times of delivery of the selection candidates, values obtained based on the stock information and the operation schedules.

12. The machine element selection support system as set forth in claim 9, wherein the database apparatus comprises a stock database for preserving information relevant to the stock of the machine elements and an operation database for preserving the operation schedules of manufacturing factories for manufacturing machine elements, and the selection support server uses, as the appointed times of delivery of the selection candidates, values obtained based on the stock information and the operation schedules.

13. The machine element selection support system as set forth in claim 1, wherein the selection support server, on receiving a selection signal relating to the presented selection candidates from the terminal, instructs the start of the order reception processing on the machine elements selected by the selection signal.

14. The machine element selection support system as set forth in claim 1, wherein the selection support server adds the margin to the specifications and operating conditions of the machine element selection information when a number of the extracted selection candidates is below a threshold.

15. The machine element selection support system as set forth in claim 1, wherein the specifications and operating conditions comprise life of the machine elements, material of the machine elements, drive method, and lubrication.

16. A machine element selection support system for supporting a selection of machine elements through a network, comprising:
a select support server connected to the network; and,
a database apparatus accessible by the selection support server,
wherein the database apparatus includes a specification database for preserving dimensions and specifications of the machine elements, and the machine elements are bearings,
wherein the selection support server receives machine element selection information from a terminal connected to the network, the machine element selection information including information relevant to specifications and operating conditions of the machine elements to be selected, purchase conditions of the machine elements, and information relevant to an output mode of information relevant to selection candidates,
wherein the selection support server extracts the selection candidates in accordance with the information of the specifications and operating conditions and information stored in the specification database, and, in accordance with the output mode, and when the selection support server extracts the selection candidates, the selection support server calculates performance indexes of the extracted selection candidates based on the specifications and operating conditions of the selection candidates,
wherein the selection support server outputs to the terminal information relevant to the selection candidates, out of the extracted selection candidates, which satisfy the purchase conditions, and
wherein the specifications and operating conditions of the machine elements comprise a permissible rotation speed of the machine elements, inside and outside diameters.

17. A machine element selection support system for supporting a selection of machine elements through a network, comprising:
a selection support server connected to the network; and,
a database apparatus accessible by the selection support server,
wherein the database apparatus includes a specification database for preserving dimensions and specifications of the machine elements, and the machine elements are bearings,
wherein the selection support server receives machine element selection information from a terminal connected to the network, the machine element selection information including information relevant to specifications and operating conditions of the machine elements to be selected, purchase conditions of the machine elements, and information relevant to an output mode of information relevant to selection candidates,
wherein the selection support server extracts the selection candidates in accordance with the information of the specifications and operating conditions and information stored in the specification database, and, in accordance with the output mode, and when the selection support server extracts the selection candidates, the selection support server calculates performance indexes of the extracted selection candidates based on the specifications and operating conditions of the selection candidates,
wherein the selection support server outputs to the terminal information relevant to the selection candidates, out of the extracted selection candidates, which satisfy the purchase conditions, and
wherein one of the machine elements is a cylindrical roller bearing and the specifications and operating conditions for the cylindrical roller bearing comprise a pitch circle diameter, a roller diameter, number of rollers, and effective contact length.

* * * * *